May 1, 1928. 1,668,448
C. A. BALCOM
SEED CLEANER
Filed April 25, 1927 4 Sheets-Sheet 1

INVENTOR.
Clarence A. Balcom,
BY Geo. F. Kimmel.
ATTORNEY.

May 1, 1928.

C. A. BALCOM 1,668,448

SEED CLEANER

Filed April 25, 1927

INVENTOR.
Clarence A. Balcom,
BY
Geo. P. Kimmel
ATTORNEY.

May 1, 1928.

C. A. BALCOM 1,668,448

SEED CLEANER

Filed April 25, 1927    4 Sheets-Sheet 3

INVENTOR.
Clarence A. Balcom,
BY
Geo. P. Kimmel
ATTORNEY.

May 1, 1928.
C. A. BALCOM
SEED CLEANER
Filed April 25, 1927 4 Sheets-Sheet 4
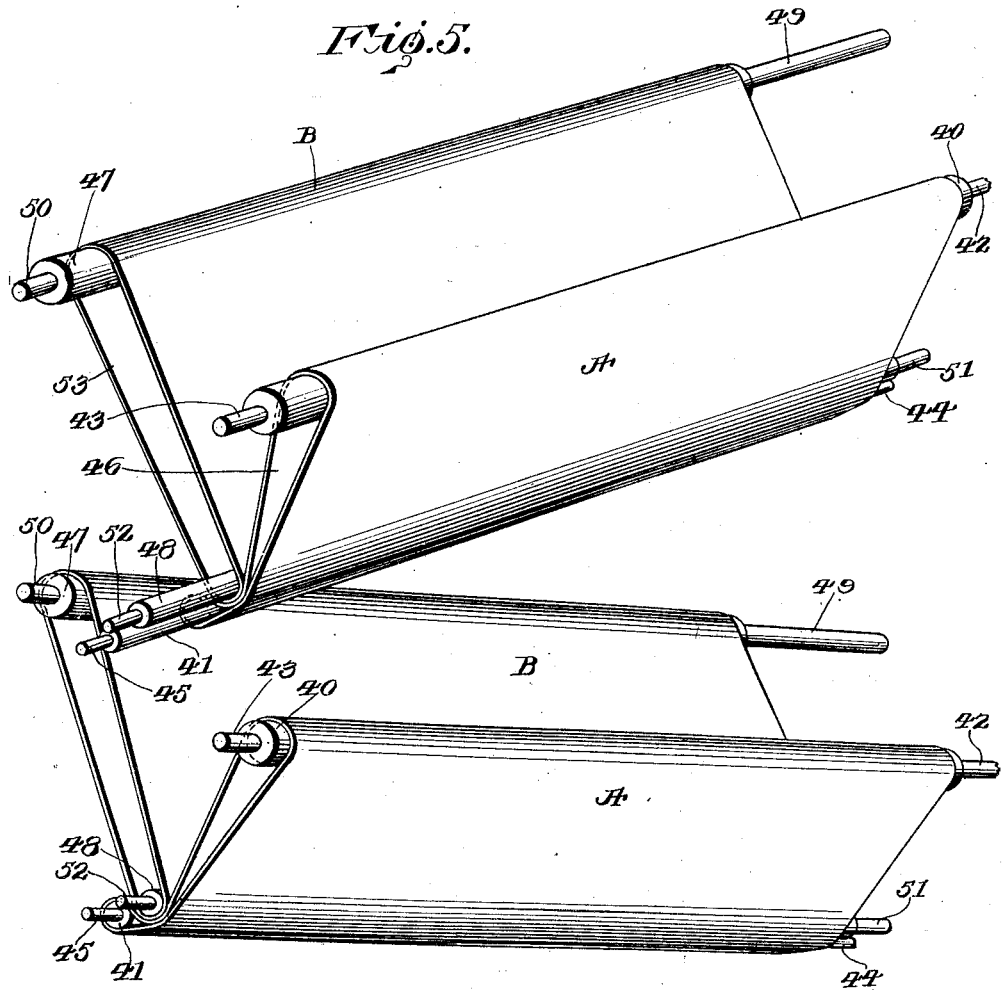
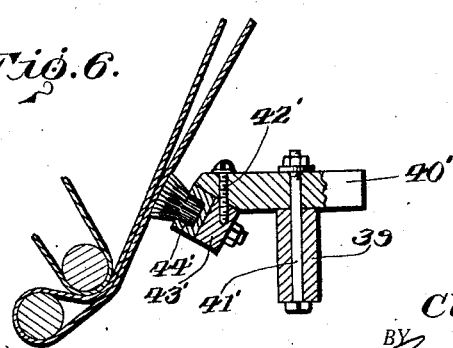
INVENTOR.
Clarence A. Balcom,
BY
Geo. F. Kimmel
ATTORNEY.

Patented May 1, 1928.

1,668,448

UNITED STATES PATENT OFFICE.

CLARENCE A. BALCOM, OF IONIA, MICHIGAN, ASSIGNOR TO THE BALCOM SEED CLEANER COMPANY, OF IONIA, MICHIGAN, A CORPORATION.

SEED CLEANER.

Application filed April 25, 1927. Serial No. 186,374.

This invention relates to a seed cleaner and has for its object to provide, in a manner as hereinafter set forth a cleaner of such class for expeditiously removing or separating foreign substances from seed for the purpose of thoroughly cleaning the latter.

A further object of the invention is to provide a seed cleaner for removing or separating foreign substances from a travelling body of seed, and with the removed or separated foreign substances, conducted off from the body of seed, during the travel of the latter, in a direction opposite to the direction of travel of the seed.

A further object of the invention is to provide, in a manner as hereinafter set forth, a machine for the purpose referred to for subjecting a body of seed to successive cleaning steps in such a manner to remove foreign substances from the seed as the latter passes from the point of intake to the point of discharge for the seed.

A further object of the invention is to provide, in a manner as hereinafter set forth a cleaner of the type referred to including a separator element in the form of an inclined trough for the travel of a body of seed therethrough by gravity, and with the walls of the trough travelling in a direction from that of the direction of travel of the seed, and providing means for separating, picking up and conducting off foreign substances from the seed during the travel thereof thereby cleaning the same.

A seed cleaner, in accordance with this invention is designed primarily for removing or separating buckhorn from clover seed to thoroughly clean the latter, but it is to be understood that the machine is adapted for use in cleaning seed of any character for which it is found applicable, and to this end the invention aims to provide a new, novel and improved cleaner, for not only removing and separating foreign substances from a body of seed to thoroughly clean the same, but further to prevent the removed or separated substances from again admixing with the seed as the latter travels toward its point of discharge.

Further objects of the invention are to provide, in a manner as hereinafter set forth, a seed cleaner which is simple in its construction and arrangement, strong, compact, durable, thoroughly efficient in its use, readily assembled and comparatively inexpensive to manufacture.

With the foregoing and other objects in view the invention consists of the novel construction, combination and arrangement of parts, as hereinafter more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 5 is a perspective view of the separator elements and their arrangement relative to each other.

Figure 6 is a fragmentary view in vertical section of a pair of separator elements.

Figure 1:
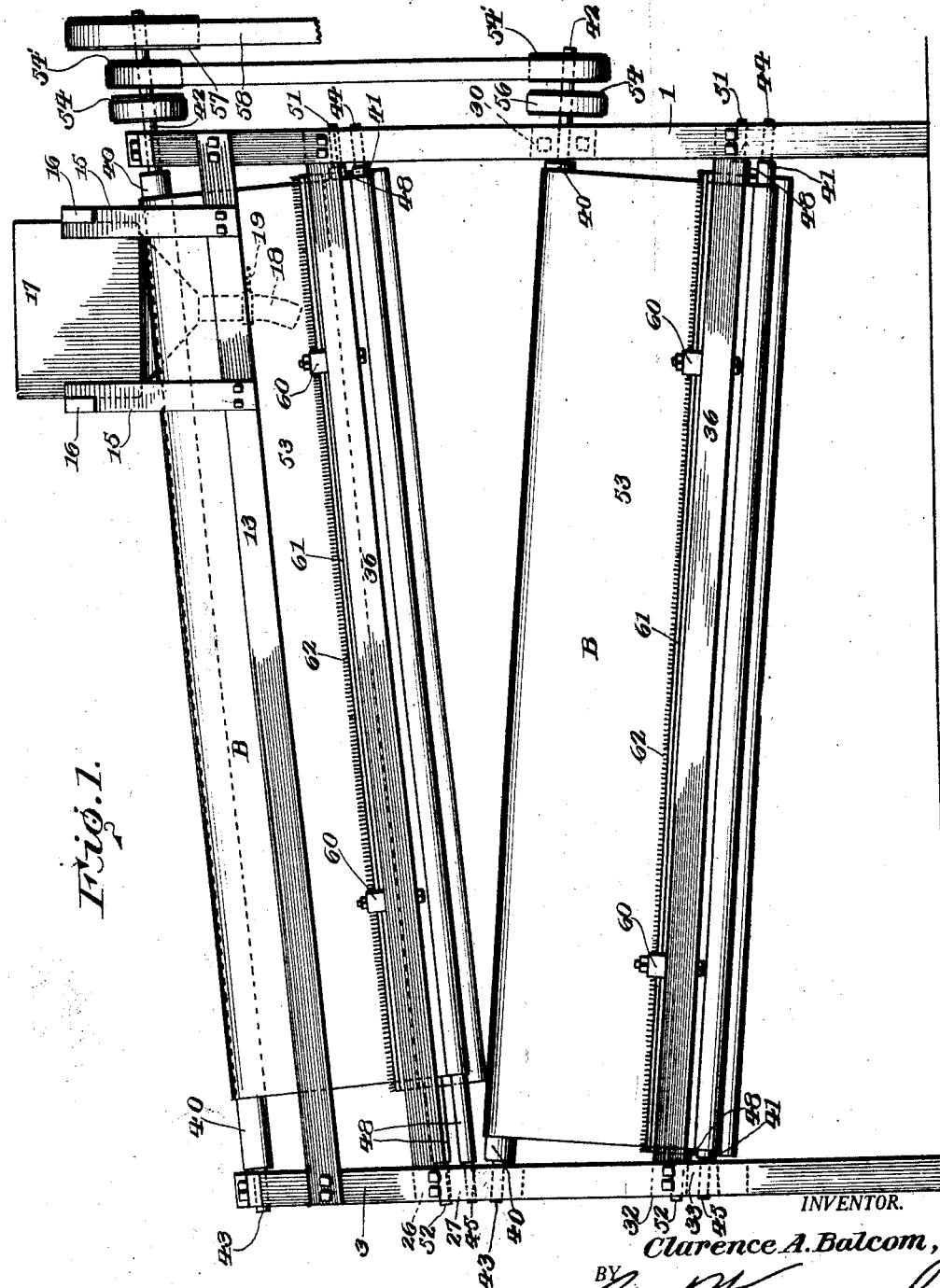
Figure 1 is a side elevation of the seed cleaner in accordance with this invention.

A seed cleaner, in accordance with this invention includes a separating means for picking up and conducting off the foreign substances from seed, and the said separating means can consist of one or more separator elements, preferably two, and which can be arranged in sidewise or in superposed relation, preferably in superposed relation and oppositely inclined with respect to each other. Each separator element is to be formed of a pair of endless travelling imperforate flexible conveyors arranged relatively to each other to provide a trough. The preferred embodiment of the invention is as illustrated, and which includes a pair of superposed, oppositely inclined separator elements, and with the upper element discharging into the lower. Each separator element provides for a body of seed to travel at a downward inclination by gravity and with each separator element operating in a manner to pick up and conduct off the foreign substances from the seed during the travel of the latter whereby the seed is cleaned. The seed is delivered into a separator element at its upper end and passes down the latter which is in the form of a trough, by gravity. During the travel of the seed the walls of the trough move upward and outward. The walls of the trough overlap at their lower ends. In connection with cleaning clover seed, by a separator element, in accordance with this invention, and with such element arranged in a manner aforesaid, it provides for the clover seed, which is naturally smooth, to travel slowly down the trough, while the buckhorn which has small claws or a rough surface will cling to the travelling walls of the trough and be carried upwardly from the seed, thereby providing for the cleaning of the latter. The walls of the trough of each separator element are preferably constructed from canvas, but can be set up of any suitable material possessing the characteristic whereby the buckhorn will cling thereto.

The seeder includes a supporting structure in the form of a frame consisting of a pair of front end bars or standards 1, 2 and a pair of rear end bars or standards 3, 4. The front end bars are of greater height than the rear end bars and connected together at their upper ends by a transverse bar 5 providing a support. The rear end bars 3, 4 are connected together at their upper ends by a transverse bar 6 which provides a support. The bars 5, 6 are mortised as at 7 to provide depending portions which extend between the end bars. The end bars 1, 2 are secured together by superposed spaced transverse bars 8, 9 which also provide supports and the end bars 3, 4 are also connected by superposed, spaced transverse bars 10, 11 which provides supports. The bar 11 is arranged above the bar 9 and the bar 10 positioned above the bar 11 and arranged below the bar 8. The bar 1 is connected to the bar 3 by a longitudinally extending bar 12 which provides a support and is arranged at the upper ends of the bars 1, 3. The bar 2 is connected to the bar 4 by a longitudinally extending bar 13 which provides a support and is arranged at the upper ends of the bars 2, 4. The bars 12, 13 are positioned exteriorly with respect to the end bars. The bars 12 and 13 are arranged below the transverse bars 5, 6. The bars 12, 13 are disposed at a downward inclination from front to rear. Secured to the bar 12, as well as the bar 13, is a pair of uprights 15. The uprights secured to the bar 12 oppose the uprights secured to the bar 13 and the uprights carried by the bar 12 are connected to the uprights carried by the bar 15 by transversely extending bars 16. The uprights 15 in connection with the bars 16 provide a suspension means for a hopper 17 which is arranged in proximity to the front end bars 1, 2 but spaced therefrom. The hopper 17 includes a spout 18 provided with a cut-off 19.

Figure 2:
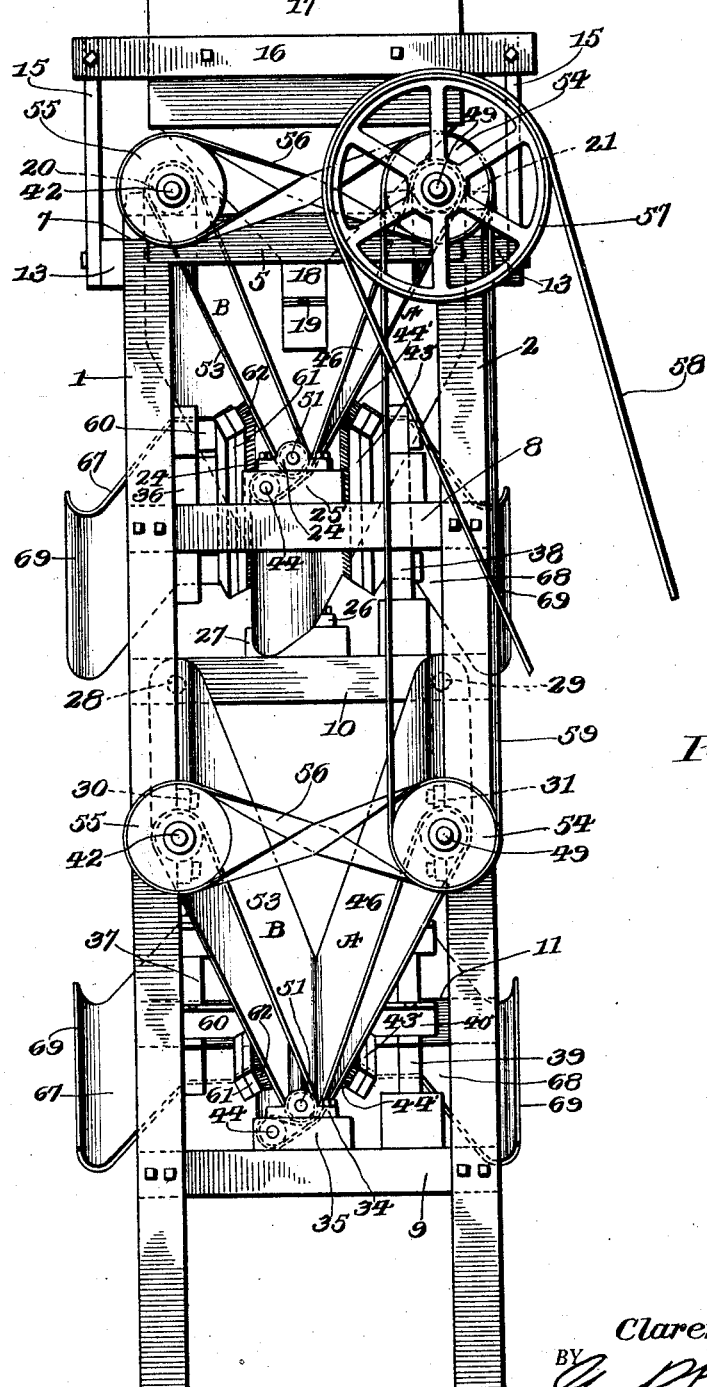
Figure 2 is an end view thereof.

Secured to the transverse bar 5, in proximity to each end thereof is a bearing element and said elements are indicated at 20, 21. Secured to the top of the transverse bar 6, in proximity to each end thereof is a bearing element and the said elements are indicated at 22, 23. Secured to the bar 8, centrally thereof, is a pair of superposed bearing elements 24, 25 and secured to the transverse bar 10 centrally thereof is a pair of superposed bearing elements 26, 27. The bar 10 in proximity to each end is apertured to receive bearing sleeves and which are indicated at 28, 29 Figure 2. The end bars 1, 2 carry bearing brackets 30, 31 respectively on the inner sides thereof and which are positioned in a plane below the bar 10. The bar 11 centrally of its top is provided with a pair of superposed bearings in the same manner as the bars 8 and 10 and which are indicated in dotted lines at 32, 33 Figure 1. The bar 9 centrally of its top is provided with a pair of superposed bearings 34, 35.

Connected to the bars 1, 3, and arranged one above the other, are longitudinally extending supports 36, 37 which are disposed at a downward inclination from front to rear thereof. Connected to the bars 8, 10 is a longitudinally extending support 38, and connected to the bars 11, 9 is a longitudinally extending support 39. The supports 36 and 37 incline in opposite directions and the supports 38 and 39 also incline in opposite directions. The function of the supports 36, 37, 38 and 39 will be presently referred to.

The bearings 20 to 27 inclusive provide means, in connection with the transverse bars 5, 6, 8 and 10, for supporting the upper separator element.

The bearing sleeves 28, 29, bearing brackets 30, 31, bearings 32, 33, 34 and 35 in connection with the transverse bars 9, 10 and 11 provide means for supporting the lower separator element.

As each separator element is of the same construction, but one will be described, as the description of one will apply to the other. Each separator element is formed of two sections and with the sections arranged relatively to each other to provide a V-shaped trough. In cross section one section of the separator is of greater height than the other and the section of greater height extends below and bears against the lower end of the section of smaller height to provide a closed bottom for the trough formed by the sections of the separator element. The section of greatest height of the separator element is indicated at A and that of the smallest height at B. The section A is slightly longer than the section B. The section A comprises an upper roll 40 and a lower roll 41, the latter being of materially less diameter than the former. Extended from each end of the roll 40 is a spindle and which are indicated at 42, 43. Extended from each end of the roll 41 is a spindle and which are indicated at 44, 45. Travelling over the rolls 40, 41 is an endless conveyor 46 in the form of a flexible apron. The section B comprises upper and lower rolls 47, 48 respectively and projecting from each end of the roll 47 is a spindle and which are indicated at 49, 50. Projecting from each end of the roll 48 is a spindle and which are indicated at 51, 52. Travelling over the rolls 47 and 48 is an endless conveyor 53 in the form of a flexible apron. The conveyors 46 and 53 provide the sides of the trough. The conveyor 53 as it travels around the roll 48 bears against the conveyor 46, near the lower end thereof, for the purpose of closing the bottom of the V-shaped trough provided by the sections of the separator elements. The spindles 42 and 49 have connected therewith pulley wheels 54, 55 respectively. The spindle 42 is also provided with a pulley 54'. The pulley wheels 54, 55 are connected together by a twisted transmission belt 56 for the purpose of driving the roll 47 from the spindle 42 and in an opposite direction with respect to the roll 40. The spindle 42 of the upper separator element carries a drive pulley 47 connected with a prime mover, not shown, by a transmission belt 58. The pulley 54' of the upper separator element is connected with the pulley 54' of the lower separator element by a transmission belt 59 whereby the separator elements will be synchronously operated.

The spindles 42, 43, 44, 45, 49, 50, 51 and 52 of the upper separator element are mounted respectively in the bearings 21, 23, 25, 27, 20, 22, 24, 26. The spindles 42, 43, 44, 45, 49, 50, 51, 52 of the lower separator element are mounted respectively in the bearing bracket 31, bearing sleeve 29, bearings 35, 33, bearing brackets 30, bearing sleeve 28, bearings 34, 32.

Associated with each section of a conveyor element for removing the separated foreign substances which are picked up and transported by the conveyors is a removing or brushing device. The device which associates with each of the sections A of the separator elements is of the same construction and the device which associates with each of the sections B of the separator elements is of the same construction. The device which associates with the section A of each separator element is connected with a support 38 or 39 and comprises a plurality of coupling members 40' connected with the support 38 or 39 by holdfast devices 41', one of which is shown in Figure 6. The coupling members are disposed transversely of the support and are connected by the holdfast devices 42' with a carrier 43', which has secured therewith a brush member 44' which bears against the outer face of a conveyor, see Figure 6. The brush device which associates with the section B of each separator element is connected to a support 36 or 37 and comprises a pair of coupling members 60, see Figure 4 which are secured to a carrier 61 provided with a brush member 62 which bears against the outer face of the section B. The brush members 44' and 62 are positioned in proximity to the lower ends of the sections A and B of the separator elements, see Figure 3. The removing devices employed in connection with the upper separator element extend downwardly at an inclination from front to rear and the removing devices associated with the lower separator element extend at a downward inclination from rear to front. The brush members 44' and 62 are disposed at an inclination see Figure 3 so that they will sweep against the outer portions of the inclined conveyors, see Figure 3.

Figure 3:
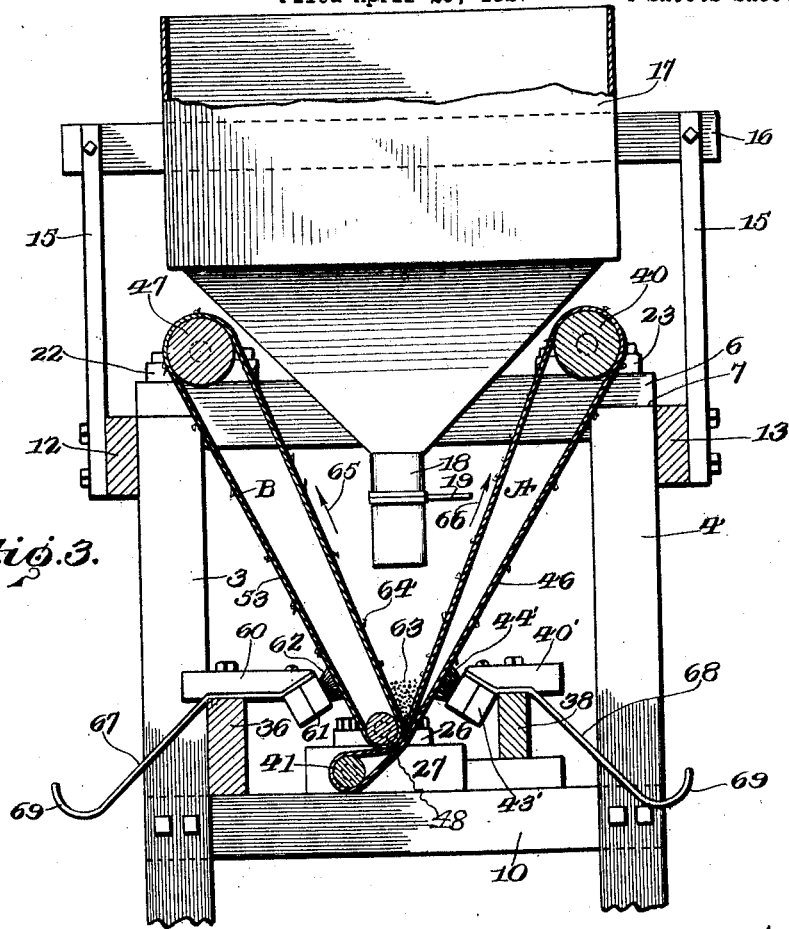
Figure 3 is a fragmentary view in cross section.
Figure 4:
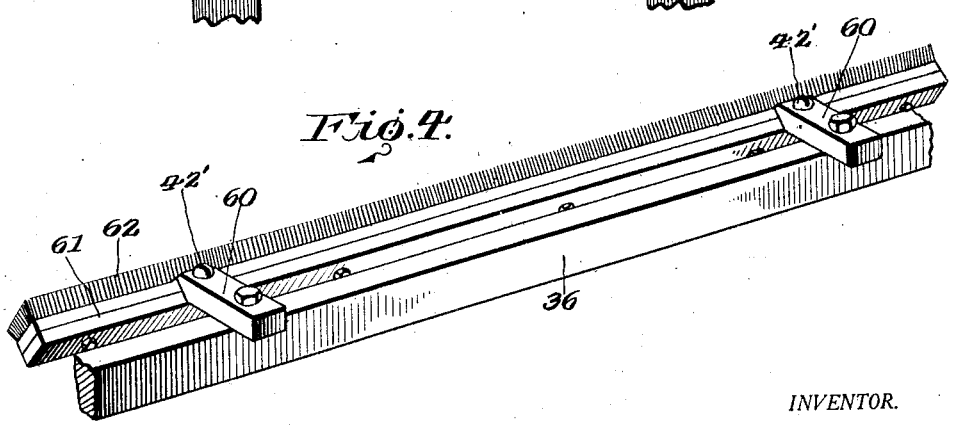
Figure 4 is an elevation of one of the brush elements and its supporting means.

With reference to Figure 3 a body of seed is indicated at 63 and the foreign substance or substances removed therefrom, such as buckhorn, is indicated at 64. The sections of each conveyor element travels in the direction of the arrows 65, 66 and the direction of travel of the inner side portions or stretches of the conveyors is at an upward inclination and in opposite directions with respect to each other. The outer side portions or stretches of the conveyors travel downwardly. As the buckhorn is picked up and separated from the seed 63 it is carried upwardly and then downwardly by the conveyors, and as the outer portions of the conveyors travel against the brush members the buckhorn is removed from the outer portions of the conveyors and fall upon combined collectors and deflectors indicated at 67, 68. The combined collectors and deflectors are disposed at opposite inclinations and are carried by and secured to the supports for the removing of brushing devices. The combined collectors and deflectors project beyond the end bars of the supporting structure or frame and have upturned outer ends indicated at 69. The combined collectors and deflectors which associate with the upper separator element prevent the separated buckhorn or other foreign substances from falling into the trough formed by the lower conveyor element.

The hopper 17 is arranged at the upper end of the upper separator element and supplied the seed to be cleaned to such element, and as the seed travels downwardly through the upper conveyor element the buckhorn or other foreign substance or substances is or are removed therefrom or rather separated therefrom and conducted away in a manner as hereinbefore referred to. The seed travels at a downward inclination by gravity through the upper separator element and is discharged into the rear or upper end of the lower separator element and any foreign substances remaining in the seed are removed therefrom as the seed travels forwardly, at a downward inclination through the lower separator element. The cleaned seed can be discharged into any suitable receptacle and the collected separated matter can be removed from the collectors when desired or can overflow upon the floor or the support upon which the cleaner is mounted. The construction disclosed provides for successive cleaning operations with respect to a body of seed whereby the latter is thoroughly and expeditiously cleaned as it travels from the intake point therefor to the discharge point thereof.

It is thought the many advantages of a seed cleaner, in accordance with this invention, can be readily understood, and although the preferred embodiment of the invention is as illustrated and described, yet it is to be understood that changes in the details of construction can be had which will fall within the scope of the invention as claimed.

What I claim is:

1. In a seed cleaner means in the form of a V-shaped trough disposed at a downward inclination to provide for the travel of a body of seed therethrough by gravity, said means including a pair of oppositely inclined endless travelling conveyors with the lower end of one overlapped by the lower portion of the other to form a closed bottom for the trough and with said conveyors providing for removing and conveying foreign substances from the seed during the travel of the latter downwardly through the trough.

2. In a seed cleaner means in the form of a V-shaped trough disposed at a downward inclination to provide for the travel of a body of seed therethrough by gravity, said means including a pair of oppositely inclined endless travelling conveyors with the lower end of one overlapped by the lower portion of the other to form a closed bottom for the trough and with said conveyors providing for removing and conveying foreign substances from the seed during the travel of the latter downwardly through the trough, and means acting against the outer side of each of said conveyors for removing therefrom the foreign substances conveyed thereby.

3. A seed cleaner comprising a seed receiving trough formed from oppositely disposed endless conveyors and with the lower end of one overlapped by the lower portion of the other to form a trough with a closed bottom, and means for operating said conveyors in directions to cause the adjacent or inner sides of the conveyors to move upwardly to provide for the inner portions thereof removing and conveying foreign substances from the seed.

4. A seed cleaner comprising a seed receiving trough formed from oppositely disposed endless conveyors and with the lower end of one overlapped by the lower portion of the other to form a trough with a closed bottom, means for operating said conveyors in directions to cause the adjacent or inner sides of the conveyors to move upwardly to provide for the inner portions thereof removing and conveying foreign substances from the seed, and means acting against the outer portions of the conveyors for removing therefrom the removed foreign substances conveyed thereby.

5. A seed cleaner comprising a seed receiving trough formed from oppositely disposed endless conveyors and with the lower end of one overlapped by the lower portion of the other to form a trough with a closed bottom, means for operating said conveyors in directions to cause the adjacent or inner sides of the conveyors to move upwardly to provide for the inner portions thereof removing and conveying foreign substances from the seed, and means for supporting the trough at a downward inclination to provide for the passage of the seed therethrough by gravity during the operation of the conveyors.

6. A seed cleaner comprising a seed receiving trough formed from oppositely disposed endless conveyors and with the lower end of one overlapped by the lower portion of the other to form a trough with a closed bottom, means for operating said conveyors in directions to cause the adjacent or inner sides of the conveyors to move upwardly to provide for the inner portions thereof removing and conveying foreign substances from the seed, means acting against the outer portions of the conveyors for removing therefrom the removed foreign substances conveyed thereby, and means for supporting the trough at a downward inclination to provide for the passage of seed therethrough by gravity during the operation of the conveyors.

7. A seed cleaner comprising a seed receiving trough formed from oppositely disposed endless conveyors and with the lower end of one overlapped by the lower portion of the other to form a trough with a closed bottom, means for operating said conveyors in directions to cause the adjacent or inner sides of the conveyors to move upwardly to provide for the inner portions thereof removing and conveying foreign substances from the seed, and oppositely disposed combined collectors and deflectors for receiving the foreign substances removed from the conveyors.

8. A seed cleaner comprising a seed receiving trough formed from oppositely disposed endless conveyors and with the lower end of one overlapped by the lower portion of the other to form a trough with a closed bottom, means for operating said conveyors in directions to cause the adjacent or inner sides of the conveyors to move upwardly to provide for the inner portions thereof removing and conveying foreign substances from the seed, means acting against the outer portions of the conveyors for removing therefrom the removed foreign substances conveyed thereby, and oppositely disposed combined collectors and deflectors for receiving the foreign substances removed from the conveyors.

9. A seed cleaner comprising a seed receiving trough formed from oppositely disposed endless conveyors and with the lower end of one overlapped by the lower portion of the other to form a trough with a closed bottom, means for operating said conveyors in directions to cause the adjacent or inner sides of the conveyors to move upwardly to provide for the inner portions thereof removing and conveying foreign substances from the seed, means for supporting the trough at a downward inclination to provide for the passage of the seed therethrough by gravity during the operation of the conveyors, and oppositely disposed combined collectors and deflectors for receiving the foreign substances removed from the conveyors.

10. A seed cleaner comprising a seed receiving trough formed from oppositely disposed endless conveyors and with the lower end of one overlapped by the lower portion of the other to form a trough with a closed bottom, means for operating said conveyors in directions to cause the adjacent or inner sides of the conveyors to move upwardly to provide for the inner portions thereof removing and conveying foreign substances from the seed, means for supporting the trough at a downward inclination to provide for the passage of the seed therethrough by gravity during the operation of the conveyors, and oppositely disposed downwardly inclined collectors for receiving the foreign substances removed from the conveyors.

11. A seed cleaner comprising a V-shaped seed receiving trough having the adjacent sides thereof travelling upwardly for removing and conveying foreign substances from seed supplied to the trough, each of the sides of the trough from the bottom to the top thereof disposed at an outward inclination, and flexible brushes suspended exteriorly of the trough, disposed lengthwise with respect to the sides of the latter and bearing against the outer side faces of the trough for moving therefrom the foreign substances conveyed by the sides of the trough for removing therefrom the foreign substances conveyed by the sides thereof.

12. A seed cleaner comprising a V-shaped seed receiving trough having the adjacent sides thereof travelling upwardly for removing and conveying foreign substances from seed supplied to the trough, flexible means arranged exteriorly of and bearing against the trough for removing therefrom the foreign substances conveyed by the sides thereof, and laterally extending means arranged exteriorly of the trough and leading from said flexible means for collecting the foreign substances removed from and conveyed by the sides of the trough.

13. A seed cleaner comprising an upper and a lower inclined seed receiving trough, said troughs spaced from each other and extending in opposite directions, the lower end of the upper trough discharging into the upper end of the lower trough, each of said troughs formed from oppositely disposed endless conveyors and with the lower end of one overlapped by the lower portion of the other to form the trough with a closed bottom, means for operating the conveyors of each trough in opposite directions, means for operating the conveyors of the lower trough from one of the conveyors of the upper trough, means for driving the conveyors of the upper trough, a brush member engaging the outer side face of each of said conveyors, and a downwardly inclined collector extending laterally from each of said brush members.

14. A seed cleaner comprising an upper and a lower inclined seed receiving trough open at each end, said troughs spaced from each other and extending in opposite directions, the lower end of the upper trough discharging into the upper end of the lower trough, each of said troughs formed from oppositely disposed endless conveyors, means for operating the conveyors of each trough in opposite directions to provide for the inner portions thereof removing and conveying foreign substances from the seed, means for operating the lower trough from the upper trough, means for operating said upper trough, a supporting structure common to said troughs, a brush member coextensive with and bearing against the outer side face of each of said conveyors, means carried by said supporting structure for suspending said brush members, and a collector extending outwardly from each of said brush members.

In testimony whereof, I affix my signature hereto.

CLARENCE A. BALCOM.